United States Patent [19]

Divakar et al.

[11] Patent Number: 5,834,387
[45] Date of Patent: *Nov. 10, 1998

[54] CERAMIC COMPRISING SILICON CARBIDE WITH CONTROLLED POROSITY

[75] Inventors: Ramesh Divakar; Sai-Kwing Lau, both of East Amherst, N.Y.

[73] Assignee: The Carborundum Company, Worcester, Mass.

[*] Notice: The term of this patent shall not extend beyond the expiration date of Pat. No. 5,589,428.

[21] Appl. No.: 903,251

[22] Filed: Jul. 25, 1997

Related U.S. Application Data

[60] Continuation of Ser. No. 715,777, Sep. 19, 1996, abandoned, which is a division of Ser. No. 464,919, Jun. 5, 1995, Pat. No. 5,589,428, which is a continuation of Ser. No. 295,956, Aug. 25, 1994, abandoned, which is a division of Ser. No. 65,037, May 25, 1993, Pat. No. 5,395,807, which is a continuation-in-part of Ser. No. 23,769, Feb. 26, 1993, abandoned, which is a continuation-in-part of Ser. No. 910,042, Jul. 8, 1992, abandoned.

[51] Int. Cl.$^6$ ......................... C04B 35/569; C04B 35/576
[52] U.S. Cl. ................................. 501/88; 501/89; 501/90; 501/91
[58] Field of Search .................................. 501/81, 82, 88, 501/89, 90, 91

[56] References Cited

U.S. PATENT DOCUMENTS

| | | |
|---|---|---|
| 3,969,451 | 7/1976 | Floyd et al. . |
| 4,179,299 | 12/1979 | Coppola et al. . |
| 4,230,497 | 10/1980 | Schwetz et al. . |
| 4,312,954 | 1/1982 | Coppola et al. . |
| 4,335,888 | 6/1982 | Ohba et al. . |
| 4,525,461 | 6/1985 | Boecker et al. . |
| 4,692,418 | 9/1987 | Boecker et al. . |
| 4,756,895 | 7/1988 | Boecker et al. . |
| 4,777,152 | 10/1988 | Tsukada . |
| 4,777,153 | 10/1988 | Sonupariak et al. . |
| 4,855,263 | 8/1989 | Kawasaki et al. . |
| 4,925,490 | 5/1990 | Nagai et al. . |
| 4,957,811 | 9/1990 | Benker et al. . |
| 4,997,192 | 3/1991 | Nagai et al. . |
| 5,080,378 | 1/1992 | Kagawa . |

FOREIGN PATENT DOCUMENTS

| | | |
|---|---|---|
| 0486336 | 5/1992 | European Pat. Off. . |
| 0500447 | 8/1992 | European Pat. Off. . |
| 0522945 | 1/1993 | European Pat. Off. . |
| 3534149C | 1/1987 | Germany . |
| 3916586C | 7/1990 | Germany . |
| 61/163174A | 7/1986 | Japan . |
| 62/132787A | 6/1987 | Japan . |
| 62/148384 | 7/1987 | Japan . |
| 62/176970A | 8/1987 | Japan . |
| 62/270481A | 11/1987 | Japan . |
| 63/055163A | 3/1988 | Japan . |
| 63/074963A | 4/1988 | Japan . |
| 63/256365A | 10/1988 | Japan . |
| 1/093468A | 4/1989 | Japan . |
| 1/148772A | 6/1989 | Japan . |
| 2/069367A | 3/1990 | Japan . |
| 2/256971A | 10/1990 | Japan . |
| 2/311376 | 12/1990 | Japan . |

OTHER PUBLICATIONS

Seshadri, et al, Ceramic Transactions, Silicon Carbide, '87, vol. 2, pp. 215–226.

Lashway, et al, Lubrication Engineering, Jun. 1984, vol. 40, pp. 356–363.

Knoch, et al, Sintered Alpha Silicon Carbide Pump Bearings—Tribological Materials Optimization to Improve Reliability, Proceedings of the Tenth International Pump Users Symposium, Mar. 1993.

*Primary Examiner*—Karl Group
*Attorney, Agent, or Firm*—Thomas M. DiMauro

[57] ABSTRACT

Silicon carbide sintered bodies having controlled porosity in the range of about 2 to 12 vol %, in which the pores are generally spherical and about 50 to 500 microns in diameter, are prepared from raw batches containing a polymer fugitive. Sintered bodies in the form of mechanical seal members exhibit lower power consumption at low PV and, in addition, lower wear rates at high PV in comparison to commercially available silicon carbide seal members.

6 Claims, 3 Drawing Sheets

CERAMIC COMPRISING SILICON CARBIDE WITH CONTROLLED POROSITY

This application is a continuation of application Ser. No. 08/715,777, filed Sep. 19, 1996, now abandoned, which is a divisional of copending application Ser. No. 08/464,919, filed Jun. 5, 1995 (now U.S. Pat. No. 5,589,428), which is a continuation of application Ser. No. 08/295,956 filed on Aug. 25, 1994 (now abandoned), which is a divisional of application Ser. No. 08/065,037, filed May 25, 1993 (now U.S. Pat. No. 5,395,807), which is a continuation-in-part of application Ser. No. 08/023,769, filed Feb. 26, 1993, now abandoned, which is a continuation-in-part of application Ser. No. 07/910,042, filed Jul. 8, 1992, now abandoned.

This invention is in the field of ceramic materials and processes. More specifically, this invention is directed to a sintered silicon carbide body comprising a controlled porous phase, as well as to the raw batch from which the body is produced, the process by which the raw batch is converted to the finished body, and a mechanical seal member made from the sintered silicon carbide.

A number of applications for silicon carbide depend upon the friction and wear (tribological) characteristics of the material, in addition to its outstanding thermal, chemical and mechanical properties. These applications include, for example, mechanical seal members, valve lifters and nozzles. Mechanical seal applications are especially demanding in that the seal interface is subjected to both large compressive stresses (P) normal to the surface and high rotational speeds or sliding velocities (V). In evaluating the performance of mechanical seal members, the product (PV), which describes the regime of operation, is an important parameter.

The most important function of a mechanical seal used in a pump or agitator is the reliable sealing of the working fluid. In most cases, this working fluid also serves to lubricate the seal interface. In general, it is not a good lubricant. Hence, the state of lubrication at the seal interface is such that substantial asperity contact occurs frequently at the seal interface, especially during start-up (also known as "boundary lubrication"). In addition, unstable situations occur during operation (usually termed "instabilities") where the lubricant can vaporize due to the heat produced. Such heavy contact or instability can lead to excessive wear of one or more of the mating faces and, consequently, premature failure of the mechanical seal. Therefore, it is beneficial that a seal member either possess an inherent self-lubricating quality or otherwise have unique inherent features that help maintain a stable, hydrodynamic fluid film separating the two mating faces. Graphite, boron nitride and silicones are self-lubricating, but silicon carbide itself is not one of these. However, porosity in the silicon carbide helps to sustain a hydrodynamic fluid film between the contacting faces.

Silicon carbide of theoretical density, 3.21 grams per cubic centimeter ($g/cm^3$), is seldom seen in commercial applications, and the silicon carbide of lesser density which is used generally contains a second, pore phase. These pores may be void or filled with silicon or some other material, depending upon the processing route and desired properties. Porosity of a few volume percent is not a factor in many silicon carbide applications and is generally ignored. U.S. Pat. Nos. 4,179,299 and 4,312,954 describe silicon carbide of less than theoretical density, and the silicon carbide disclosed therein can be found in many commercial mechanical seal applications. A more recent patent, U.S. Pat. No. 4,525,461, discloses a sintered silicon carbide which also contains graphite. This graphitized silicon carbide, which is said to be self-lubricating and useful in mechanical seal applications, also contains pores. Thus, silicon carbide sintered bodies which contain pores are not new per se. However, purposely incorporating pores of definite size and shape is a recent development.

The use of various forms of silicon carbide in seal applications has been described by Lashway in Lubrication Engineering, 40, 356 (1984). Among the forms of silicon carbide tested by Lashway was a sintered silicon carbide containing pores; the manner in which it was produced was not disclosed. The pores in this silicon carbide, comprising 8–10 volume percent (referred to as "vol %" hereinafter) of the body, were closed and small, and on the order of 20 microns in size. Lashway attributed the superior seal face performance of this porous silicon carbide to its ability to retain a hydrodynamic film of the sealed liquid on the seal face. For purposes of this application, vol % porosity=100–100×[observed density/theoretical density].

Although potentially useful, introducing porosity into a sintered silicon carbide body by variations in the sintering time/temperature profile has not been reproducible enough to enable this technique to be used for making commercial porous material. Hence, such materials do not exhibit the "controlled" porosity referred to hereinafter.

Another method that can produce porous sintered silicon carbide involves reduction in the amount of sintering aids. This method decreases densification, and a more porous ceramic body is produced. Control over this process is the major deterrent to its use. Precise control of the raw materials is necessary to make this method dependable. This is not possible with today's materials at reasonable cost, thus making the processing window for this method very small and hard to predict.

Porous sintered ceramics can also be produced by adding other materials that thermally degrade and/or shrink, such as cellulose, plant products of many types and shapes/sizes, and inorganic materials such as glass or low temperature ceramics. These materials may, however, present difficulties in mixing with the fine silicon carbide powder and, further, may interfere with the sintering mechanism.

Consistent with Lashway's 1983 report, it was disclosed in German Offen. DE 3927300, laid open Feb. 2, 1990, that sintered silicon carbide bodies having between 4 vol % and 13 vol % porosity, where the pores averaged between 10 microns and 40 microns in diameter, provided superior mechanical seals. Such porous bodies were prepared by introducing spherical organic polymer beads into the raw batch from which the green bodies were produced and then heating the green bodies to remove the organic and sinter the body. It was said that, at pore volumes less than 4 vol %, the porosity was insufficient to effect the improvement, while at pore volumes greater than 13 vol %, the strength of the body was adversely affected, and the pores intercommunicated, causing leakage of the seal. Further, if the average pore diameter was less than 10 microns, the lubricating liquid in the pores was not sufficiently available, while at pore diameters greater than 40 microns, carbon seal face wear was accelerated and seal leakage occurred. It was said that the pores must be rounded in order to avoid stress concentration in the sintered body.

Whereas the introduction of porosity into a sintered silicon carbide body can be effected by introducing organic polymer beads into the raw batch, this technique can lead to undesired results. For example, the polymer must be removed from the ceramic body if pores are to be created. This has been accomplished heretofore by thermal decomposition of the polymer, either prior to or during the sintering process. It has been noted, however, that, depending upon the type of polymer chosen, attempted removal can lead to carbonization of the polymer beads. To the extent residual decomposition products, such as carbon, remain, they constitute contaminants which can affect the physical properties of the ceramic body.

The presence of pores in silicon carbide can be detrimental to its performance to the extent physical properties of the sintered body affect its performance. In this regard, Seshadri. et al., Ceramic Trans., 2, 215 (1987), reported preparing sintered silicon carbide bodies with a series of porosities in the range 1 to 7.5 vol % by altering the sintering parameters and carbon additions. The flexural strength of the resultant sintered silicon carbide bodies was reported to be insensitive to the porosity up to a porosity of 7 vol %, but the elastic constants and fracture toughness were affected significantly.

It is well known that the affect of a structural defect upon the mechanical properties of a ceramic body is directly related to the size of the defect. If the pores in a ceramic body are not independent, but interconnected, the effective size of the defect is dramatically increased.

Thus, there is needed an alternative method for introducing a controlled amount of porosity into a sintered silicon carbide body. Among the various techniques available, the addition of organic fugitive polymer beads to the raw batch is superior, in principle, to methods which rely on manipulating the sintering parameters. Using fugitive polymer beads, it should be possible to realize silicon carbide with "controlled porosity" wherein pore size, shape, quantity and distribution can be reproduced from batch to batch.

Consequently, this invention provides, in one aspect, a silicon carbide sintered body comprising controlled porosity in the range of 2 to 12 vol % wherein the pores are substantially uniformly distributed throughout the body and exhibit a generally spherical shape of 50 to 500 microns in average diameter. The substantial independence of the pores from each other is assured, in preferred embodiments of the invention, by adjusting the size of the fugitive polymer beads employed in making the body and their number so the porosity in the sintered body does not exceed 9 vol %.

In another aspect, this invention provides a raw batch for preparing the aforesaid silicon carbide sintered body, said raw batch comprising 75 to 95 weight percent silicon carbide; 0.5 to 7 weight percent polymer fugitive; 0.3 to 3 weight percent of a sintering element selected from boron, aluminum, or mixtures thereof, 0.3 to 20 weight percent carbon source; 1.2 to 5 weight percent binder; and, optionally, minor amounts of lubricant and surfactant.

In another aspect, the invention provides a process for producing the aforesaid porous silicon carbide sintered body from the raw batch previously described. The process comprises:

(a) providing the raw batch as a mixture by blending the silicon carbide, the boron source, the carbon source, and the binder;

(b) providing a dispersion comprising a polymer fugitive dispersed in an inert solvent;

(c) stirring said raw batch mixture and adding said disperson thereto producing a slurry;

(d) drying said slurry, yielding a raw batch as a flowable powder;

(e) compacting said raw batch powder into a green body of desired shape; and (f) sintering said green body at a temperature between 2060° C. to 2200° C. under an inert atmosphere.

In a further aspect, the invention provides a mechanical seal member comprising the above-described silicon carbide sintered body.

The present invention, including the manner and means by which it can be carried out, is clarified by reference to the drawings which accompany this specification and to the detailed description which follows.

Figure 1:
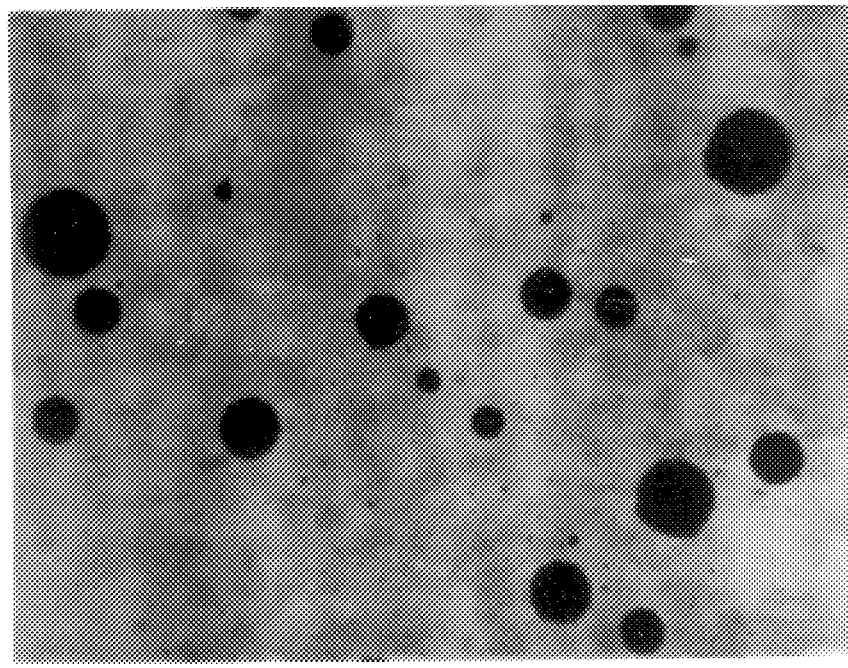
FIG. 1 is a photomicrograph at 100× of an unetched, sectioned silicon carbide sintered body produced in accordance with Example 2 hereinafter.

The practice of this invention does not depend upon the specific nature of the silicon carbide starting material. Although by no means necessary, it is preferred that the silicon carbide be the alpha, non-cubic crystalline form, since the alpha form is less expensive and more readily obtained than the beta, cubic crystalline form. It is particularly preferred that the alpha silicon carbide exhibit "equiaxed" morphology, as described in U.S. Pat. No. 4,179,299, in other words, the sintered silicon carbide grains have an aspect ratio predominantly no more than 3:1. The equiaxed morphology therefore provides a relatively fine grain size. However, the beta form, or mixtures of alpha and beta crystalline material, can be employed, as can amorphous, non-crystalline silicon carbide powder, provided the average grain size meets the requirements hereinafter specified. The process used to make the sintered bodies of this invention does not cause any substantial amount of phase transformation, so the crystalline habit of the silicon carbide starting material will be substantially retained in the finished sintered ceramic body.

The silicon carbide starting material can be obtained from any of a variety of sources. Vapor phase reacted material is produced in fine particle size and can be used if desired. Larger material can be ball milled or otherwise reduced in size until sufficient amounts of fine silicon carbide are obtained, and the proper size of silicon carbide can be selected from the ball milled product by conventional means, such as water sedimentation or screening. In any event, it is preferred that the silicon carbide material shall have been treated with acid (such as hydrofluoric and/or nitric acids, particularly mixtures of hydrofluoric and nitric acids) to remove extraneous materials which may interfere with the sintering operation.

According to the invention, porous, sintered ceramic bodies having densities in excess of 2.8 g/cm$^3$, corresponding to at least 88 percent of the theoretical density of silicon carbide and with no more than 12 vol % pores, are readily produced and generally required to avoid seriously affecting the mechanical properties of the sintered body. Although the density can be as low as 2.8 g/cm$^3$ (porosity of 12 vol %), a sintered density of at least 2.85 g/cm$^3$, corresponding to no more than 11.3 vol % pores, is preferred. The minimum porosity required in order to substantially affect the tribological properties of the sintered body is believed to be 2 vol % (corresponding to a density of 3.15 g/cm$^3$) but 3 to 4 vol % is the preferred lower limit. Most preferably, the porosity of the body does not exceed 9 vol % corresponding to a density of about 2.92 g/cm$^3$, the pores therein being generally spherical and substantially uniformly distributed within the silicon carbide, the pores having a nominal, i.e., average, diameter between 50 to 500 microns, preferably from 50 to 200 microns, and most preferably from 50 to 100 microns. Such bodies can be used "as is" for applications such as mechanical seal members, or they can be machined to the desired size and shape at a lower density and later subjected to further firing to produce additional densification.

The sintered ceramic body in accordance with the present invention comprises from 91 to 99 weight percent silicon carbide. The sintered body further comprises from 0.5 to 5 weight percent carbon; from 0.15 to 3 weight percent of a sintering element selected from boron, aluminum, or mixtures thereof; and up to 1.0 weight percent additional carbon which is chemically associated with the sintering element, such as boron as boron carbide or aluminum as aluminum carbide. All weight percentages herein are specified with respect to the total weight of the body or batch, unless otherwise indicated.

In preferred embodiments, the sintered ceramic body comprises from 0.5 to 4 weight percent carbon associated with carbonized organic material, from 0.2 to 0.4 weight percent boron as boron carbide, and 0.05 to 0.11 weight percent additional carbon associated chemically with the boron, with the balance of the composition being silicon carbide. Most preferably, the sintered ceramic body contains 98 to 99 weight percent silicon carbide, 1 to 1.5 weight percent carbonized organic material, 0.25 to 0.36 weight percent boron as boron carbide, and 0.07 to 0.10 weight percent additional carbon chemically associated with the boron.

In specifying the content of the sintering element in the sintered ceramic body, it is not intended to limit the form in which the sintering element may be present; in other words, boron may be present as elemental boron or combined in boron compounds such as boron carbide. Indeed, in most cases the sintering element will be present as a part of a compound containing such element, such as boron carbide, in the finished sintered ceramic body. The term "additional carbon" means carbon which is chemically associated with the sintering element and broadly specified as being present in an amount up to 1.0 weight percent. Thus, this additional carbon is an optional component in the resulting sintered ceramic body. The amount of such additional carbon present will, of course, depend on the amount of carbon associated with the sintering element in the raw batch mixture from which the sintered ceramic body was made. The amount of carbon present as carbonized organic material depends on the amount of such organic material added to the raw batch, as well as the char yield (carbon content) of the organic material. Sintering elements are described more fully hereinafter.

The raw batch for producing the sintered ceramic body in accordance with the invention comprises 75 to 95 weight percent, and preferably 80 to 90 weight percent silicon carbide powder. The silicon carbide powder should have a small particle size, e.g., from 0.2 micron to 1.5 microns, and preferably 0.5 micron. The surface area of the silicon carbide powder may in some instances be more descriptive than particle size, and the surface area thereof should be at least 7 m$^2$/g.

The raw batch also contains an organic polymer material which is employed to define the pores in the final sintered body but is removed in the course of sintering the green ceramic body. In this sense, the material is a "polymer fugitive." A distinguishing feature of this invention is that it provides a means to achieve controlled porosity having a predetermined, customizable, porous microstructure. That is, it is possible, by conducting the invention, to establish in the raw batch stage the microstructure of the finished sintered ceramic body with regard to pore size, shape and amount. These variables are fixed by incorporating a calculated amount of a polymer fugitive of certain average size and shape. The polymer fugitive constitutes 0.5 to 7 weight percent of the raw batch, preferably 1 to 4 weight percent.

Selection of the polymer fugitive is an important consideration in the production of sintered porous bodies with desirable tribological properties. The fugitive selected must have certain thermal characteristics, as well as certain physical and mechanical properties, since the fugitive must withstand all of the initial processing steps and then decompose and exit the ceramic body.

In the first place, the fugitive polymer must be sized properly. The fugitive particle size and shape should be selected to correspond with the size and shape of the pores desired in the finished ceramic body. However, the polymer will generally be available as polymer particles with a certain nominal particle size. It is preferred, but not essential, that the distribution of sizes about the nominal size be as narrow as possible, in other words, monodisperse. If desired, the polymer fugitive can be screened, either wet or dry, using an appropriate sieve, so as to obtain a narrower size distribution. It is also preferred that the particles be spherical or nearly so in shape, since rounded defects (rounded pores) minimize stress concentrations in the finished ceramic body.

It is known that the strength of ceramic materials is determined largely by the flaws in the body, the larger the flaw, the lower the strength of the body. In ceramics produced by traditional techniques, the flaws introduced in the processing, especially in spray drying the raw batch, are the largest flaws. In sintered silicon carbide, these flaws are typically 100 to 200 microns in average dimension. Thus, the most preferred range for the pore size and closely related polymer fugitive particle size is from 50 to 100 microns. The pores should preferably be closed and independent from each other; interconnected pores increase the effective size of the defect and may affect the mechanical properties of the finished ceramic body. For those applications where mechanical strength is not critical, the pore size and related polymer fugitive particle size is suitably from about 50 to 500 microns in diameter, and preferably from 50 to 200 microns. Although the strength of such sintered bodies may, insome instances, be less than those the above-described most preferred range, it is believed that they nevertheless possess good tribological properties.

If the porous sintered body is to be used as a seal which must perform effectively under demanding service conditions, interconnection of the pores is detrimental in that interconnected pores can provide a path for leakage for the fluid being sealed. The undesirability of pore interconnection in seal applications is in contrast to the interconnected porosity which is desirable if the ceramic is utilized as a filter. In a microstructure containing pores which are discrete and independent, the pore diameter, vol % porosity and pore nearest neighbor distance are interdependent. Assuming the pores are all of the same size and evenly distributed throughout the body, the average nearest neighbor distance (NND) decreases as either the volume fraction porosity (VFP)=(vol % porosity/100), or the average pore diameter (D=2R) is increased until, at some point, pores, on average, begin to touch each other. The condition that the pores remain substantially independent and not touch each other, on average, is satisfied if NND>D. If the pores are spherical, it can be shown that these parameters are related approximately by the equation:

$$NND^3=(0.554)^3(4\pi R^3/3VFP)$$

This relation indicates that, ideally, at VFP's greater than 0.088, or about 9 vol % porosity, the pores will not be totally independent and some pores will touch, regardless of the pore size. Similar, but more complicated analyses can be done if the pores are not all of the same size. Thus, the preferred maximum silicon carbide porosity using an approximately monodisperse polymer fugitive is about 9 vol %.

The polymer fugitive can be introduced at various points in the process for making the sintered ceramic body, but it is hardly possible to prevent contact between the polymer fugitive particles and solvent which may be present in the raw batch. Consequently, the polymer fugitive should be chemically inert with respect to any solvent which is employed, as well as with respect to other components of the raw batch.

Furthermore, the fugitive must be stable in size and shape when the raw batch is spray dried at elevated temperatures, a preferred processing step. More specifically, the glass transition temperature and crystalline melting point should be at least 80° C. preferably higher than 100° C.

During traditional forming steps, such as isostatic pressing, the polymer fugitive particles must be able to substantially retain their size and shape. Hence the polymer selected desirably exhibits high compressive strength and stiffness. Excessive elastic recovery of the polymer is undesirable, as this may lead to uncontrolled defects in the ceramic body. Hollow beads, or microballoons are not as desirable as solid polymer particles, since they tend to flatten under the compression used to produce a shaped, green ceramic body prior to sintering.

Once the green body has been formed, the polymer fugitive is removed. In order to facilitate this, the polymer should vaporize and/or decompose cleanly at temperatures no higher than 600° C. before the green ceramic body sinters at higher temperatures. Thermogravimetric analysis, coupled with weight loss determination, can be employed to verify beforehand that a candidate polymer meets this requirement. Such investigations of polymethylmethacrylate (PMMA), polystyrene (PS) and polyethylene (PE), for example, show that at 550° C. these polymers are completely decomposed, and substantially no residues remain in the ceramic body.

Finally, it is also desirable that the polymer be readily available in a desired particle size and shape and that it be relatively inexpensive, since it is consumed in making the sintered ceramic body. With these considerations in mind, polymer fugitives selected from thermoplastic and thermosetting resins are suitable, especially the group consisting of acrylic resins, e.g. PMMA; vinyl resins, e.g., PS, PE, polypropylene (PP), and polyvinylchloride (PVC); cellulose acetate (CA); cured epoxy resins (EPR); and polyimide resins (PI) are effective, as are co- and terpolymers, such as poly (ethylene-co-vinylacetate) and poly-(acrylonitrile-ter-butudiene-ter-styrene), as well as the aforesaid polymers modified with small amounts of cross-linking agents, such as divinylbenzene (DVB), thereby providing cross-linked polymers.

For example, styrene can be copolymerized in the presence of a small amount of DVB, thereby providing a cross-linked polymer fugitive. In general, a cross-linked fugitive is preferred in that cross-linking often leads to a stiffer, stronger polymer having a higher glass transition temperature ($T_g$), and polystyrene cross-linked as described herein is effectively employed in the invention. Polyethylene is readily available and may be used in the low density (0.91 to 0.93 g/cm$^3$) or high density (0.95 to 0.97 g/cm$^3$) forms.

One important feature of the raw batch of the present invention is the carbonizable organic material or carbon source. The organic material can be soluble in organic solvents, but it is preferred that it be soluble in water for safety and environmental reasons. In any case, it is important that it be easily dispersed to coat the silicon carbide particles, thereby increasing the availability of the carbonized organic material upon firing the shaped green body produced from the raw batch. It has been found desirable that the sintered ceramic body contain from 0.5 to 5.0 weight percent of carbonized organic material, with the result that, if the carbonizable organic material has a char yield of from 25 to 75 weight percent, as is preferred, there should be present from 0.3 to 20 weight percent carbonizable organic material in the raw batch. Within the range of from 25 to 75 weight percent char yield, it is preferred that the organic material have from 33 to 50 weight percent and more preferably from 40 to 45 weight percent char yield. If the char yield is between 33 and 50 weight percent, the amount of carbonizable organic material in the raw batch should range between 1 and 10 weight percent to produce a preferred range of 0.5 to 4 weight percent carbon in the finished sintered ceramic body. The most preferred amount of carbonized organic material in the sintered ceramic body is believed to be 1 to 1.5 weight percent, so that the optimum raw batch should contain 4 weight percent of carbonizable organic material, preferably soluble in water and having a char yield between 40 and 45 weight percent.

Carbonizable organic materials are represented by phenolic resins and coal tar pitch, which have char yields of 40 to 42 weight percent and on the order of 60 weight percent, respectively. As between phenolic resins and coal tar pitch, the phenolic resins are preferred, and B-stage phenolic resole resins, such as Resin No. 8121 available from Varcum Chemical Co., are particularly useful in this invention. Of greater utility, however, are phenol-formaldehyde resins, which in some instances are water soluble. An example is "Plyophen 43290 Liquid One Step Phenolic Resin" available from Occidental Chemical Co.

The sintering element can be added to the raw batch in its elemental form, or as a compound containing such element, such as boron carbide, aluminum carbide, or aluminum nitride as previously mentioned herein. The use of boron or boron-containing compounds as a sintering aid for densification of silicon carbide ceramic bodies is described more fully in U.S. Pat. Nos. 4,312,954 and 4,179,299. The use of aluminum or aluminum-containing compounds with carbon as a sintering aid is described in U.S. Pat. No. 4,230,497.

The sintering element is preferably boron in its elemental form or a compound thereof, such as boron carbide. Boron carbide is essentially a non-stoichiometric material, and various boron carbides having a molar ratio of boron to carbon between 8:1 and 2:1 have been reported. It is, in general, preferred to use boron carbide as a source of the sintering element and, in particular, boron carbide which is so-called "solid state reacted boron carbide," with a molar ratio of boron to carbon between 3.5/1 and 4.1/1. Such boron carbide can be produced in accordance with the process of U.S. Pat. No. 3,379,647. Boron carbides having higher ratios of boron to carbon are more chemically reactive than the material having a ratio of 3.5/1 to 4.1/1. but are less available, more expensive, and therefore not preferred.

The amount of sintering element added to the raw batch depends on the content of such element in the final sintered ceramic body. The sintered ceramic body should contain from 0.15 to 3.0 weight percent of the sintering element. In preferred embodiments employing boron or boron-containing compounds, the ceramic bodies have from 0.2 to 0.4 weight percent boron. The most preferred boron content of the sintered ceramic bodies is 0.25 to 0.36 weight percent. The amount of the sintering element source should be chosen accordingly. Thus, if the sintering element source is elemental boron, it should optimally be present in the raw batch in an amount to yield a sintered ceramic body having from 0.25 to 0.36 weight percent boron. For the preferred solid state reacted boron carbide, with a molar ratio of boron to carbon between 3.5:1 and 4.1:1, the boron carbide should be present in the raw batch in an amount from 0.3 to 3 weight percent to produce such an amount of boron in the resulting sintered ceramic body.

Where boron is used, it can be crystalline or amorphous and preferably is a powder having an average grain size less than 30 microns. Within this limitation, it is preferred that the particle size be in the range from 0.1 micron to 10 microns.

The temporary binder can be selected from a wide range of organic resins and other materials well known to those skilled in the art, such as polyvinyl alcohol, acrylic resins, coal tar pitch, long chain fatty material (for example "CARBOWAX"), metallic stearates, such as aluminum stearates and zinc stearates, sugars, starches, alginates, and polystyrene. Many of these materials are, of course, capable of functioning as a polymer fugitive or a carbonizable organic material which is added to yield at least some of the carbon in the sintered body. Thus, a single material can serve more than one function in the raw batch. The temporary binder should comprise between 1.2 and 5 weight percent of the raw batch, depending upon the char yield, for example.

The binder preferably includes polyvinyl alcohol having associated therewith from 5 to 15 parts by weight water per part of polyvinyl alcohol, as a temporary binder vehicle. In particular, it is preferred to use 10 parts by weight polyvinyl alcohol plus 90 parts by weight water as a temporary binder vehicle. In addition, the aqueous polyvinyl alcohol may have associated therewith other resins selected from the classes recited above. A material which can be used, for example, is "RHOPLEX® HA-8 Emulsion," available from Rohm & Haas Company.

Figure 3:
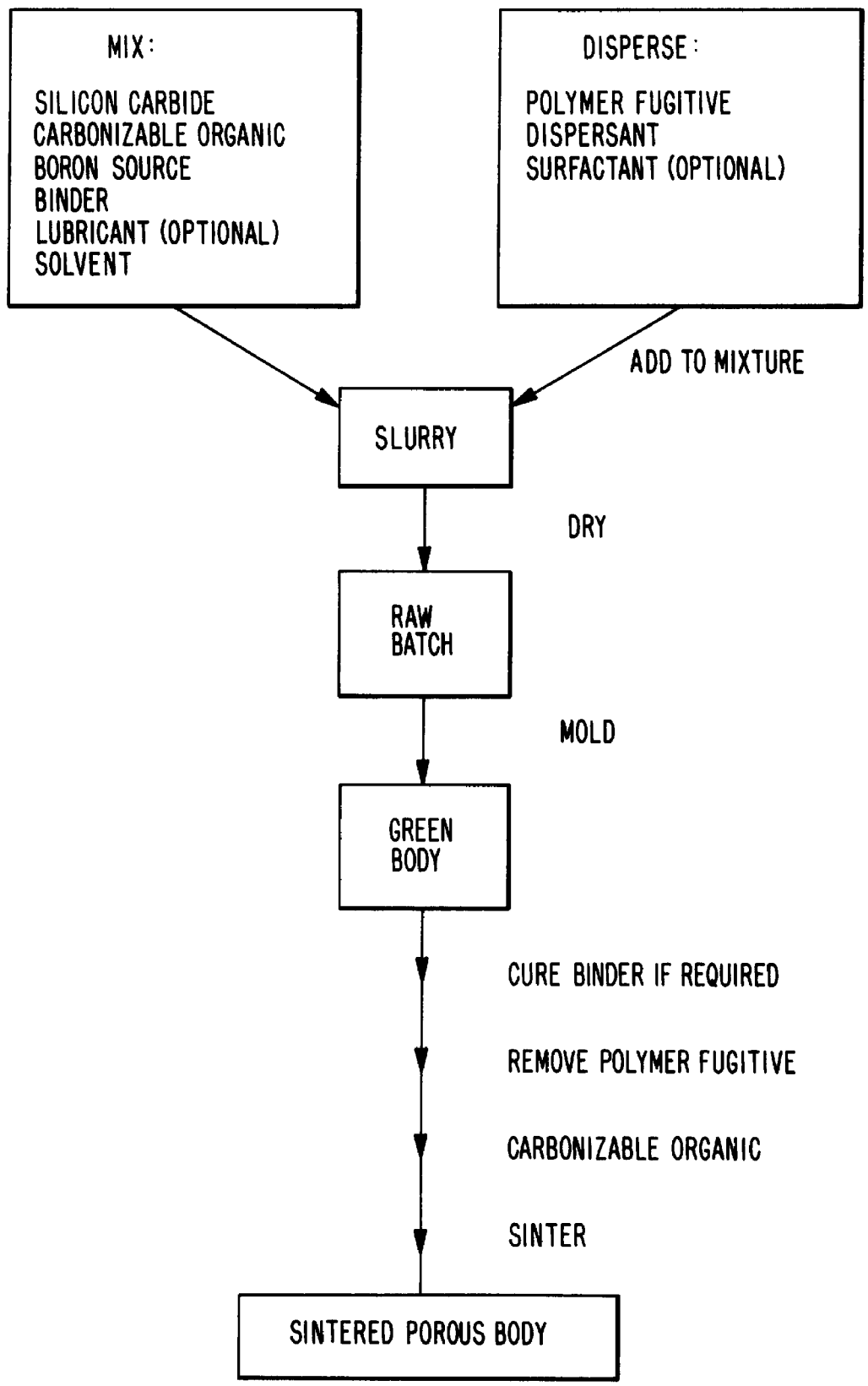
FIG. 3 is a diagrammatic flow chart illustrating the process of this invention.

The process for producing the sintered ceramic body according to another aspect of the invention is illustrated in FIG. 3 and begins by first mixing together the components of the raw batch to contain from 75 to 95 weight percent silicon carbide; between 0.3 and 20 weight percent of the carbonizable organic material; from 0.3 to 3 weight percent of the sintering element; from 1.2 to 5 weight percent temporary binder; as well as, optionally, between 2 about 8 weight percent lubricant; and, optionally, 0.4 to 1.2 weight percent surfactant. The first mixing step preferably includes stirring the powdered components, silicon carbide, carbonizable organic material and sintering element, together with the temporary binder and lubricant prior to optionally adding a solvent in which the carbonizable material is soluble. In any event, after the solvent is added, the mixture should be well stirred for at least 5 to 15 minutes to coat the carbonizable organic material onto the silicon carbide particles. The polymer fugitive is separately dispersed in water or other dispersant to which it is inert, the dispersion containing generally between 1 and 50 weight percent polymer and a surfactant combined, and preferably about 30 weight percent. The polymer dispersion is added to the silicon carbide-containing mixture, yielding a slurry. After the slurry has been sufficiently stirred, it is dried by one of the techniques known in the art, such as passing a quantity of dry gas over the stirred slurry or by spray-drying the slurry, yielding the raw batch in the form of a flowable powder.

Following this drying step, the dried raw batch can be molded into a shaped body, preferably having a density of at least about 1.60 g/cm$^3$. For example, the mixture can be formed into mechanical ring seal members if desired. This can be accomplished by any of a variety of techniques which are known to those skilled in the art. For example, the mixture can be shaped by extrusion, injection molding, transfer molding, casting, cold pressing, isostatic pressing, or by compression. If compression is used, preferred pressures are between 4,000 and 100,000 psi, with between 16,000 and 20,000 psi, e.g., about 17,000 psi at room temperature being most preferred.

If the temporary binder requires curing, such as when the binder contains polyvinyl alcohol, the temporary binder can be cured by heating the shaped body at a temperature of 90° C. to 100° C. for 1 to 2 hours. Other curing conditions, known to those skilled in the art, may be employed for other binders. Similarly, the polymer fugitive can be vaporized and/or decomposed and removed from the ceramic body by heating for a discrete predetermined time at a discrete predetermined temperature, and the carbonizable organic material can be carbonized by heating at a predetermined time at a predetermined temperature. Alternatively, discrete curing and decomposition steps can be omitted if desired, since both curing and decomposition will occur during heat-up to the silicon carbide sintering temperature. Firing requires heating the formed body for 20 to 60 minutes at temperatures between 1900° C. and 2500° C. The use of lower temperatures is generally to be avoided, since at lower temperatures densification of the body may not be reproducible, and controlled porosity may not be achieved. At higher temperatures sublimation of the silicon carbide can occur.

The firing step can be carried out in a conventional batch or continuous furnace, wherein the shaped body is passed through the hot zone of the furnace at a rate to provide a prescribed residence time at the desired temperature. Details of such furnaces are known in the art, and are described, for example, in U.S. Pat. No. 3,689,220. The firing step accomplishes a "pressureless sintering," referred to herein for simplicity merely as "sintering." By "sintering" or "pressureless sintering" it is meant that no mechanical pressure is applied to the object being fired or sintered to promote densification. Instead, the object being sintered, usually in an inert container such as a graphite crucible, is maintained under an atmosphere of inert gas, a reducing gas, a vacuum, or nitrogen. Reducing gases include hydrogen, carbon dioxide and carbon monoxide; inert gases include argon, helium, and neon. The gases in which the sintering operation can be carried out thus include argon, carbon dioxide, carbon monoxide, helium, hydrogen, neon and nitrogen or mixtures thereof. Although nitrogen, under sintering conditions, enters into reaction to some degree with the silicon carbide, it does so in sufficiently minor degree that the composition of the sintered ceramic body is not noticeably changed thereby. The use of nitrogen does, however, raise the sintering temperature, so that if nitrogen is the surrounding atmosphere, the preferred sintering temperature is between 2260° and 2300° C. Under the other gases, particularly inert gases such as argon, helium or neon, the preferred sintering temperature is between 2060° and 2200° C. The firing can also be carried out under vacuum. By "vacuum" it is meant a practical vacuum of 1.0 torr or less.

The following specific Examples illustrate the practice of the several aspects of this invention.

EXAMPLE 1

A raw batch of the following composition was prepared by mixing together the following components:

| COMPONENT | WEIGHT PERCENT |
|---|---|
| Alpha-silicon carbide | 84.75 |
| $B_4C$ | 0.59 |
| Phenolic resin | 4.07 |
| Polyvinyl alcohol (18 percent aqueous solution) | 2.46 |
| RHOPLEX HA-8 Emulsion | 3.24 |
| ARLACEL 83R (lubricant)[a] | 1.59 |
| Polymethylmethacrylate[b] | 2.54 |
| Surfactant[c] | 0.76 |
| | 100.00 |

[a] Available from ICI America.
[b] Available from Scientific Polymer Products, Inc., Lot 037A.
[c] Includes 0.02 weight percent TRITON-X nonionic surfactant available from Rohm and Haas and 0.74 weight percent styrene-malaeic anhydride surfactant available from Arco Chemicals.

The silicon carbide had a surface area of about 7 $m^2$/g. It was obtained from the Norwegian Company, Arendal, as 0.325 mesh powder and was then milled to a 0.45 micron mean particle size. The boron carbide was solid state reacted material obtained from Washington Mills Electro Minerals Corp., Niagara Falls, N.Y. The phenolic resin carbon source, or carbonizable organic, was PLYOPHEN 43290 resin from Occidental Chemical Company having a char yield of 42.5%. The polymethylmethacrylate ("PMMA") was in the form of essentially spherical beads having an average size of 70 microns, as determined by quantitative image analysis. The polyvinyl alcohol was obtained in granular form as AIRVOL 603 from Air Products and Chemicals, Inc. and was dissolved in deionized water. The char yields of the polyvinyl alcohol and PMMA were zero under the sintering conditions employed. The components other than the PMMA and the surfactant were mixed with water to produce a slurry. The PMMA was dispersed at a concentration of 30 weight percent solids in deionized water having a pH of 10 and also containing the surfactant. A small amount of the prescribed silicon carbide was added to assist in dispersion of the polymer. The latter dispersion was added to the silicon carbide slurry, and the mixture was continuously stirred to ensure a good distribution of the polymer in the slurry. After mixing for 15 minutes, the resultant mixture was spray dried according to the procedure well known in the art, yielding a raw batch composition as a fine, flowable powder.

EXAMPLE 2

Figure 4:
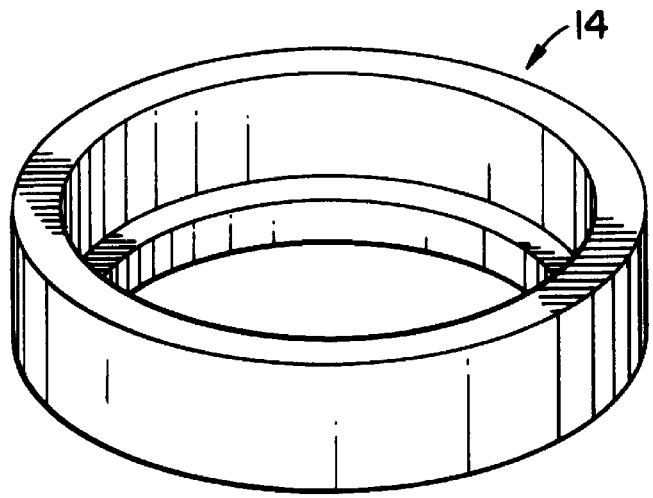
FIG. 4 is a view in perspective showing a mechanical seal member within the scope of this invention.

The spray-dried powder from Example 1 was subsequently molded into seal blanks with dimensions of approximately 92 mm (outer diameter), 67 mm (inner diameter), and 27 mm thick using the isostatic pressing technique under 17 ksi pressure. The seal blanks were sintered under an argon atmosphere at 2150° C. for 90 minutes. The resultant seal blanks were ground to final seal dimensions, 75 mm OD×57 mm ID×22 mm thick. The silicon carbide microstructure in the sintered seal members was characterized by optical microscopy and quantitative image analysis. The porosity in the microstructure, as determined by both density determination and by quantitative image analysis, was 7.5 vol %. The pores, on average, were about 70 microns in diameter and essentially spherical. A photomicrograph showing the microstructure is included herewith as FIG. 1, and a mechanical seal member made therefrom is shown in FIG. 4.

EXAMPLE 3

Seal members from Example 2 were lapped, yielding a surface finish characterized by an average surface roughness of 0.03 micron and a flatness of less than 2 helium light bands. One such seal was fitted against a phenolic resin impregnated, carbon-graphite mating seal on one side of a high pressure, high speed, seal test stand obtained from Feodor Burgmann GmbH, Wolfratshausen, Germany. An identical pair of seals were fitted on the other side of the test stand to conduct the test in duplicate. The test stand was pressurized to 10 bar, and the test was conducted at this pressure at 60° C. in water. The PV value, as defined herein, determined by this seal test was 55 bar × m/s or 157,000 psi × ft/min., a relatively low value representing mild operating conditions. Parameters used to assess seal performance include power consumption, wear rate of the carbon-graphite mating seal and wear rate of the test seal. For comparison, an identical test was conducted in duplicate using silicon carbide seals made of commercial HEX-OLOY® SA silicon carbide available from The Carborundum Company. The overall results from these tests indicated that the porous silicon carbide seal of this invention performs at a level equal to or better than the commercial seal member. Specifically, the porous silicon carbide seal of this invention exhibited a 5 percent lower power consumption and a wear rate equivalent to the carbon-graphite and commercial silicon carbide seal members. No leakage was observed with either the porous silicon carbide seals of this invention or with the commercial silicon carbide seal members.

The aforesaid seal tests were repeated, but at 75 bar and 60° C. in water. The PV level in this test was 232 bar × m/s or 663,000 psi × ft/min., a relatively high value representing severe operating conditions. Results from these tests indicated that the porous silicon carbide seal members of this invention perform significantly better than the commercial silicon carbide seals. Power consumption was reduced by 7.5 percent and the carbon-graphite wear rate was decreased 63 percent in the case of the porous silicon carbide seal members of this invention as compared with the commercial silicon carbide material, both silicon carbides being run against phenolic-impregnated carbon-graphite seal members. From the data, the wear rate of the porous silicon carbide seal members was 74 percent less than the wear rate of seal members made of the commercial silicon carbide. No leakage was exhibited by the porous silicon carbide seal of this invention.

The seal test results at 10 and 75 bar are summarized in the following Table:

| | Seal Material | |
|---|---|---|
| | Commercial SiC | Porous SiC |
| Power Consunption, kW | | |
| 10 bar | 0.56 | 0.53 |
| 75 bar | 1.06 | 0.98[a] |
| Wear Rate: Carbon-Graphite, micron/hr | | |
| 10 bar | 0.04 | 0.06 |
| 75 bar | 0.79 | 0.29[a] |
| Wear Rate: SiC, micron/hr | | |
| 10 bar | 0.03 | 0.02 |
| 75 bar | 0.19 | 0.05[a] |

[a] Average of two determinations.

EXAMPLE 4

Figure 5:
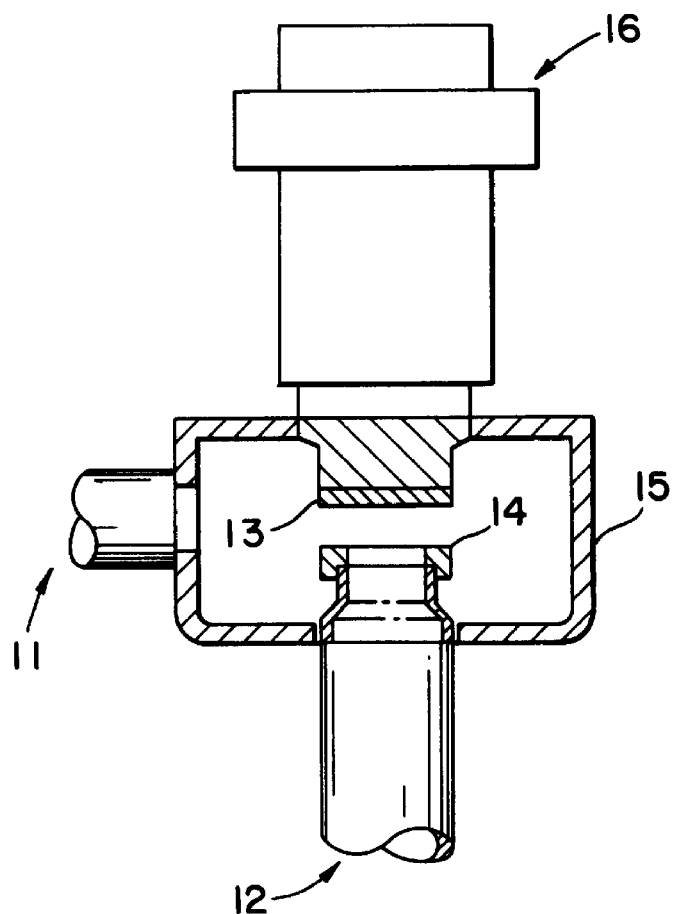
FIG. 5 is an elevational view, partially in section, showing a mechanical seal member of this invention as it may be used in a mechanical seal application.

The use of porous silicon carbide bodies as a seal member is illustrated by reference to FIG. 5. which shows a valve with a portion thereof broken away, liquid enters the valve at 12, passes into housing 15, and exits at 11. The mechanical seal members 13 and 14, which are shown disengaged, permitting the liquid to flow, are engaged face to face by rotating screw handle 16, bringing seal member 13 down upon seal member 14 to close off the liquid flow. Either or both of seal members 13 and 14 may be porous silicon carbide within the scope of this invention.

EXAMPLE 5

Figure 2:
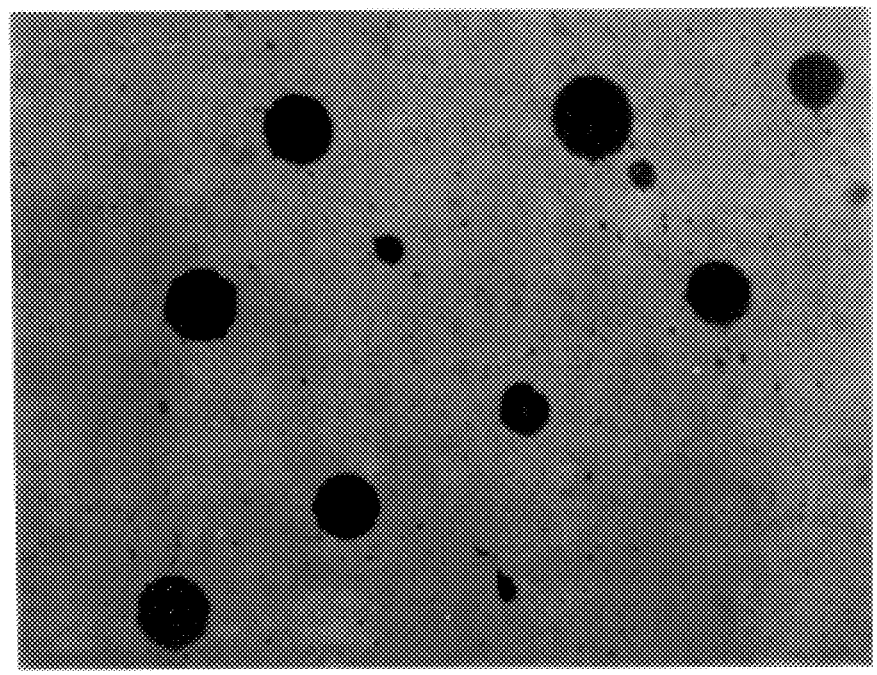
FIG. 2 is a photomicrograph at 200× of an unetched, sectioned silicon carbide sintered body produced in accordance with Example 5 hereinafter.

Examples 1 and 2 were repeated, except that polystyrene cross-linked with 2 percent DVB having an average diameter of 50 microns, obtained from Eastman Kodak Co., was employed instead of the PMMA. Study of the microstructure of the resulting sintered porous silicon carbide seals indicated the pores were about 50 microns in diameter and spherical. The pores occupied 6 vol % of the resulting sintered body. A photomicrograph showing the microstructure is included herewith as FIG. 2.

EXAMPLE 6

Examples 1 and 2 are substantially repeated, except that beads of PMMA had an average diameter of about 130 microns. The raw batch had substantially the same composition as the raw batch of Example 1. The microstructure of the resulting sintered porous silicon carbide had pores which were about 130 microns in diameter and spherical. The pores occupied 7.5 vol % of the sintered body. The body had a measured density of 2.967 grams/cm$^3$.

EXAMPLE 7

Example 6 was substantially repeated, except that a larger amount of the beads was used in preparing the raw batch. The raw batch had the following composition:

| COMPONENT | WT % |
|---|---|
| Alpha-silicon carbide | 83.40 |
| B$_4$C | 0.58 |
| Phenolic resin | 3.99 |
| Polyvinyl alcohol (18% aqueous solution) | 2.44 |
| RHOPLEX HA-8 emulsion | 3.14 |
| ARLACEL 83R (lubricant) | 1.57 |
| Polymethylmethacrylate | 4.15 |
| Surfactant | 0.73 |
| | 100.00 |

The microstructure of the resulting sintered porous silicon carbide body had pores which were about 130 microns in diameter and spherical. The pores occupied 12 vol % of the sintered body.

EXAMPLE 8

Example 6 was substantially repeated, except that the beads had an average particle diameter of 190 microns. The raw batch has substantially the same composition as Example 6. The microstructure of the resulting sintered porous silicon carbide body had pores which are about 190 microns in diameter and sperical. The pores occupied 7.5 vol % of the sintered body.

EXAMPLE 9

Examples 1 and 2 were substantially repeated, except that aluminum nitride and carbon were used as a sintering agent, instead of boron carbide. The aluminum nitride was obtained from Alcan Aluminum. The raw batch had the following components:

| COMPONENT | WEIGHT PERCENT |
|---|---|
| Alpha-silicon carbide | 84.24 |
| Aluminum Nitride | 1.26 |
| Phenolic resin | 4.04 |
| Polyvinyl alcohol (18 percent aqueous solution) | 2.46 |
| RHOPLEX HA-8 Emulsion | 3.17 |
| ARLACEL 83R (lubricant)[a] | 1.58 |
| Polymethylmethacrylate[b] | 2.52 |
| Surfactant[c] | 0.73 |
| | 100.00 |

[a]Available from ICI Arnerica.
[b]Available from Scientific Polymer Products, Inc., Lot 037A.
[c]Includes 0.02 wt % TRITON-X nonionic surfactant available from Rohm and Haas and 0.74 weight percent styrene-malaeic anhydride surfactant available from Arco Chemicals.

The phenolic resin was the source of carbon. The polymethylmethacrylate beads had an average diameter of 50 microns. The microstructure of the resulting sintered silicon carbide body had pores which, on average, were 50 microns and spherical. The pores occupied 7.5 vol % of the sintered body.

It is evident that this invention can be carried out in ways other than those illustrated in the aforesaid specific Examples. Accordingly, the scope of this invention is not to be limited to those specific Examples, but rather is to be accorded the full scope represented in the following claims.

We claim:

1. A sintered ceramic body comprising silicon carbide, and further comprising porosity in the range of about 2 to about 9 volume percent, the porosity consisting essentially of substantially independent pores having a nominal diameter between about 50 microns and 500 microns, said pores of said sintered ceramic body being represented by the equations;

$$NND^3=(0.554)^3(4\pi R^3/3VFP) \text{ and}$$

$$NND>D$$

where;

NND is average nearest neighbor distance,

VFP is volume fraction porosity where

VFP=Vol % porosity/100 and

D=2R, where R is average pore radius.

2. The sintered ceramic body of claim 1, wherein the silicon carbide comprises between 91 weight percent and 99 weight percent of the sintered ceramic body.

3. The sintered ceramic body of claim 1 wherein the porosity is distributed uniformly throughout the body.

4. The sintered ceramic body of claim 1 wherein the porosity is essentially spherical in shape.

5. The sintered ceramic body of claim 1 wherein the pores have a nominal diameter of between 50 and 200 microns.

6. The sintered ceramic body of claim 1 wherein the pores have a nominal diameter of between 50 and 100 microns.

* * * * *